United States Patent [19]

Lantz

[11] 4,027,753

[45] June 7, 1977

[54] IN-AXLE VEHICLE WHEEL SPEED SENSING DEVICE

[75] Inventor: Charles Hunter Lantz, Troy, Ohio

[73] Assignee: The B.F. Goodrich Company, Akron, Ohio

[22] Filed: Apr. 15, 1976

[21] Appl. No.: 677,215

[52] U.S. Cl. .............................. 188/181 R; 310/168
[51] Int. Cl.² .......................................... B60T 8/08
[58] Field of Search ................... 188/181 A, 181 R; 310/168

[56] References Cited
UNITED STATES PATENTS 3,960,248  6/1976  Tribe .............................. 188/181 R Primary Examiner—Duane A. Reger
Attorney, Agent, or Firm—Harry F. Pepper, Jr.; W. A. Shira, Jr.

[57] ABSTRACT

A wheel speed sensor is adapted to be mounted entirely within the bored end of an axle. The sensor comprises a rotor, stator, permanent magnet and coil, all compactly mounted in a hermetically sealed housing. A retainer is provided within the axle bore for securing the sensor against rotational and axial movement relative to the bore. The rotor shaft which is mounted within the housing is provided with an extension which passes in sealed relationship through the housing and beyond the end of the axle. A connector arm is attached to the rotor shaft extension for engagement with the wheel hub cap.

6 Claims, 5 Drawing Figures

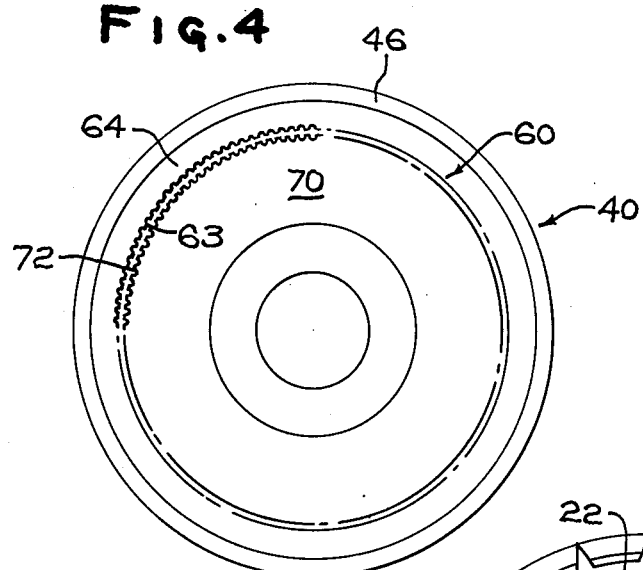
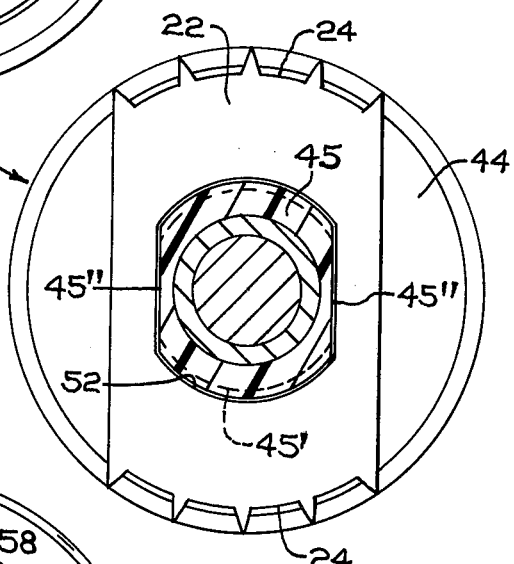
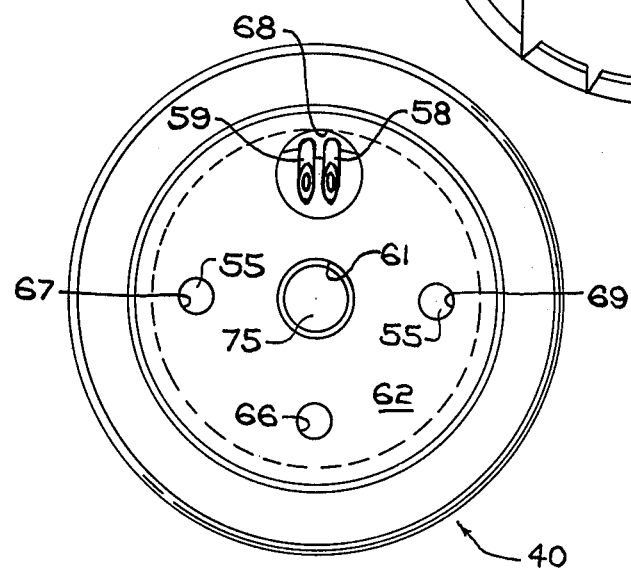

IN-AXLE VEHICLE WHEEL SPEED SENSING DEVICE

BACKGROUND OF THE INVENTION

The invention relates to wheel speed sensors and in particular to wheel speed sensors mounted in or on a wheel axle.

Sensing devices for wheel rotational speed are common components in vehicle brake anti-skid or anti-lock systems. These systems normally include, in addition to a sensor, a valving mechanism for regulating pressure to the brakes and an electronic monitoring controller which receives signals from the sensor and activates the valving means to vary the brake pressure in accordance with the signals.

The sensors presently in use generally include a rotor, stator, permanent magnet and coil. The rotor and stator are generally provided with a fixed number of teeth or notches. The coil and magnet are arranged relative to the rotor and stator, so that flux lines from the magnet through the stator to the rotor can be interrupted by rotating the rotor relative to the stator. A changing flux field is set up around the coil thereby inducing an alternating current in the coil. The frequency of this current is proportional to the speed of the rotor. Connecting the rotor to the wheel results in an alternating current with frequency proportional to wheel speed.

How and where a sensor is disposed relative to the wheel are important factors affecting cost, design and operation of the sensor. Sensors have been mounted at or near a rotating portion of the brake. In such a position, the sensor is exposed to dirt and extreme temperatures and is not easily accessible for replacement or repair. Mounting the sensors at or near the end of an axle has overcome the access problem but the bearing oil and dirt exposure problem still remains. Also, in cases of most of these "in-axle" sensors, only a portion of the sensor is actually disposed within the axle, with the portion outside the axle serving to obstruct access to the wheel hub, necessitating removal of the sensor before removal of the wheel hub is possible. Furthermore, these in-axle sensors seem prone to axial or rotational movements relative to the axle which affects the signals sent to the controller. Exemplary disclosures of in-axle sensors characterized by one or more of the aforementioned problems are U.S. Pat. Nos. 3,473,120; 3,566,169; 3,915,266 and United Kingdom patent specification No. 1,321,117.

SUMMARY OF THE INVENTION

It is an object of the present invention to provide an axle and wheel speed sensor wherein the sensor assembly is compactly arranged for disposition entirely within the axle.

It is a further object to provide a sensor assembly disposed within an axle so that as to permit substantially unobstructed removal of a wheel hub mounted on the axle.

It is a further object to provide an axle and wheel speed sensor combination wherein all key components of the sensor are hermetically sealed within a housing, the sensor is disposed entirely within the axle and is positively prevented from rotational and axial movement relative to the axle.

These and other objects to be evident from the following descrition are achieved by providing an axle having a cylindrical bore axially extending from an end of the axle and a sensor assembly having a nonmagnetic housing sized to fit entirely within the bore. A rotor assembly, stator, permanent magnet and coil are sized and contoured to compactly fit within the housing and are mounted in operative relationship therein. A curved sheet metal retainer member is also disposed within the bore adjacent the housing, which when flattened locks the sensor assembly against rotational and axial movement relative to the bore. An extension from the rotor assembly passes through the housing beyond the axle end and is provided with a connector arm for engagement with a hub cap of a wheel.

BRIEF DESCRIPTION OF THE DRAWINGS

In the accompanying drawings which illustrate the invention according to a presently preferred embodiment:

FIG. 3 is a view taken of the sensor assembly of FIG. 2 taken along lines 3—3 of FIG. 2.

FIG. 4 is a view of the sensor assembly of FIG. 2 taken along lines 4—4 of FIG. 2.

FIG. 5 is a view of the sensor assembly of FIG. 2 taken along lines 5—5 of FIG. 2.

DETAILED DESCRIPTION

FIGS. 1 through 4 of the drawings illustrate the present invention in accordance with a presently preferred embodiment. Although the following description will often relate applicant's invention in terms of its application to anti-skid systems for truck trailers, it is to be understood that the scope of applicant's invention is not to be necessarily limited to such an application.

Figure 1:
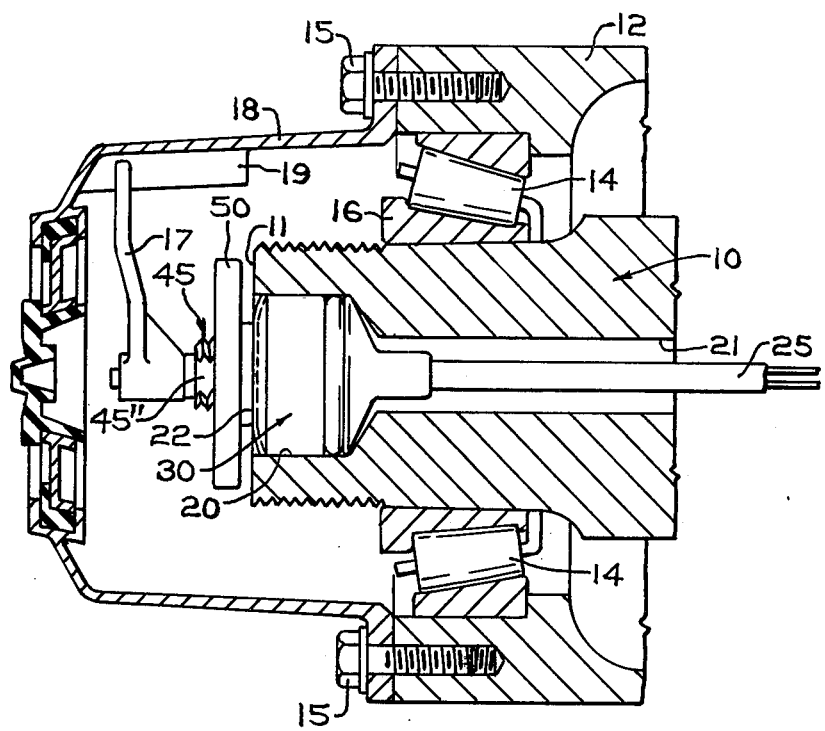
FIG. 1 is a side view showing a sensor assembly mounted within the end portion of an axle with certain portions shown in section or omitted.

In FIG. 1, a typical, hollow, nonrotating axle 10 is shown supporting a hub portion 12 of a wheel (not shown) for rotation on roller bearing members 14 supported on a journal member 16. A hub cap or cover 18 is shown secured to the wheel hub 12 by suitable fasteners such as bolts 15. The hub cap 18 contains a flange-like member 19 secured on a portion of the inner surface of the hub cap and positioned to engage, upon rotation of the hub cap, a lever or arm connector member 17.

The hollow axle 10, as seen in FIG. 1, is provided with an enlarged cylindrical bore 20 extending axially inwardly from the end 11 of the axle. Bores such as 20 in axle 10 can vary in axial length for truck trailer axles for example, this bore length can be between 1.000 in. to 2.000 in. (2.54 cm to 5.08 cm). Normally, however, a typical enlarged bore such as 20 is about 1.630 in. (4.064 cm) in diameter. The larger bore 20 reduces to a smaller diameter bore 21 extending through the axle 10. The smaller bore 21 is typically about 0.75 in. (1.905 cm) in diameter.

According to the present invention, a sensor assembly 30 is disposed within the bore 20. A cable 25 extends from the rear of the sensor 30 through the small diameter bore 21 for ultimate connection to a controller mechanism (not shown). The sensor is locked in position in bore 20 by a curved steel plate retainer 22 flattened by pressure from a hand nut 50 screwed on a central boss member 45. The flattened plate 22 when flattened engages the wall of bore 20 and holds the sensor 30 against rotational or axial movement within bore 20 as will be hereinafter explained in greater detail.

Figure 2:
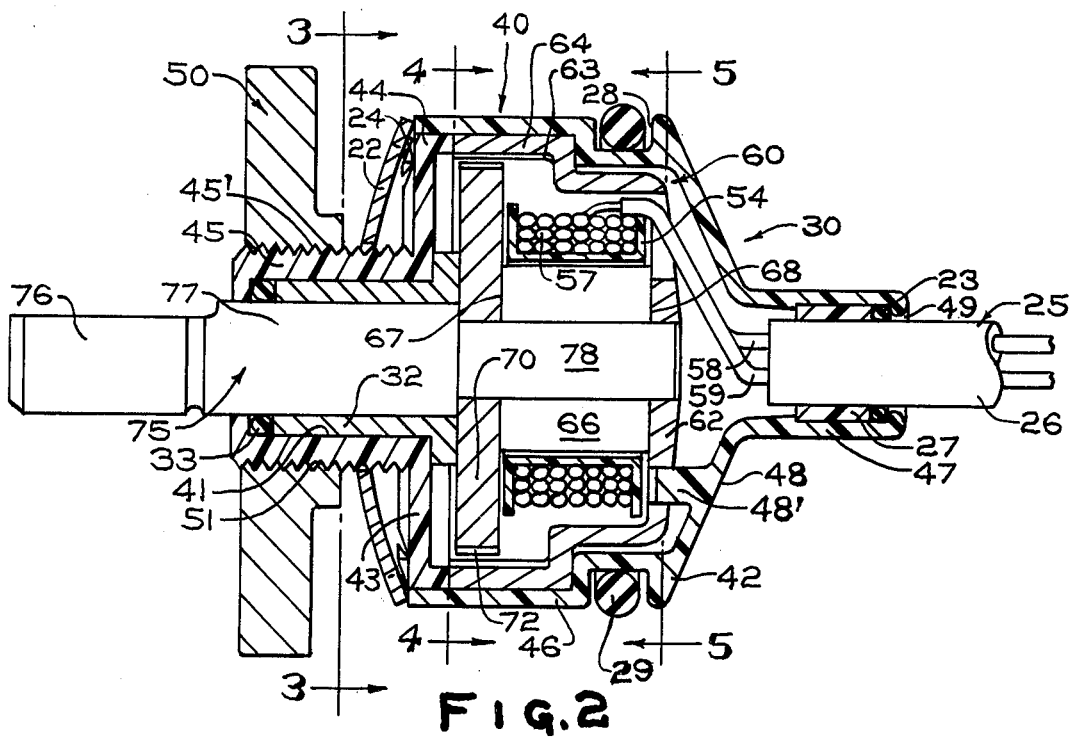
FIG. 2 is an enlarged side view of the sensor assembly with portions thereof broken away, in section or omitted.

FIG. 2 shows the sensor assembly and several of its associate parts in greater detail. The sensor 30 includes an outer annular nonmagnetic, hermetically sealed housing 40. The housing 40 comprises a cup-shaped portion 42 and a cover 44. The cup-shaped portion 42 comprises a generally cylindrical sidewall 46 and a generally frusto-conical rear wall 48. The cylindrical sidewall 46 has an annular groove 28 formed in its outer surface for reception of an O-ring 29. The rear wall 48 has a central cylindrical extension portion 47 with an opening 49 for extension therethrough of cable 25. The cover portion 44 of housing 40 comprises a disc shaped front wall portion 43 telescopically secured to the cylindrical sidewall 46. The cover 44 has a central, cylindrical boss 45 providing a shaft opening 41. Both components 42 and 44 of housing 40 are nonmagnetic material and are preferably of reinforced plastic such as glass-filled polyester.

A portion of the outer surface of boss extension 45 of cover 44 is threaded as shown at 45′ while a portion of the outer surface of boss extension has two flat sides 45″ (see FIG. 3). This particular contour of boss extension 45 allows the curved retainer 22 to be mounted on the extension 45 for nonrotative movement because the retainer has a central opening 52 with flat sides corresponding to flat sides 45″ on boss 45. A hand tightenable nut 50 with internal threads is disposed on boss extension 45. The nut 50 when tightened down will bear against retainer 22, flattening the same so that the toothed portion 24 of the periphery of the retainer will engage the surface of bore 20, thereby locking the sensor assembly against rotational and axial movement within bore 20. The retainer 22 is preferably formed of a high quality heat treated steel.

The inner surface of the rear wall portion 48 of housing 40 is provided with a mounting flange 48′ for mounting an annular stator member 60 within housing 40. The stator 60 is of cup-shaped design having a rear wall portion 62 and a cylindrical side wall portion 64. The inner surface of side wall portion 64 is provided with a predetermined number of circumferentially spaced, axially extending notches or teeth 63. This predetermined number is preferably sixty so that sensor 30 can produce electrical frequency of 60 cycles per revolution. Because of the relatively small size of the stator, machining of sixty teeth on the stator is impractical. Thus, the stator 60 is preferably formed by casting using ferromagnetic metal powder and allowing for suitable formation of the notched portion of the stator.

As best seen in FIG. 5, the rear wall 62 of stator 60 is provided with five openings, a central opening 61 and openings 66, 67, 68 and 69. The opening 61 is for reception of the end of a rotatable shaft 75 to be described in more detail hereinafter. Opening 66 is for reception of mounting flange 48′ provided on the rear wall 48 of housing 40. Openings 67 and 69 each receive one of a pair of mounting lugs 55 which extend rearwardly from an annular plastic bobbin 54.

Mounting bobbin 54 is trough-shaped as shown in FIG. 2 and carries a coil or winding 57 of electrically conductive wire. Leads 58 and 59 from coil 57 pass through opening 68 in rear wall 62 of stator 60, enter a cable sheath member 26 and pass from the sensor housing through opening 49 in extension 47 of housing 40. The cable 25 is held immobile relative to housing opening 49 by a cable retainer member 27. The opening 49 is sealed by an O-ring 23.

A rotatable shaft 75 enters the front wall of housing 40 through opening 41 of boss 45, within which is mounted an annular bushing 32. Opening 41 is sealed by an O-ring 33. The shaft 75 has portions of varying diameter, an outer portion 76 to which is secured the lever or arm connector 17, an intermediate portion 77 which rotates within bushing and a reduced diameter portion 78, the end of which is mounted for rotation in opening 61 in the rear wall 62 of stator 60. The shaft 75 is preferably of a material which will not transmit magnetism from the sensor to any metallic chips or other impurities present in bearing oil. Material found suitable for shaft 75 is phosphorus bronze.

A disc-like rotor 70 is secured to the reduced diameter portion 78 of shaft 75 for rotation therewith. The periphery of rotor 70 is provided with a predetermined number of notches 72 equal in number to the notches 63 or stator 60. Because of its small size, the rotor 70 is also formed as is stator 60 by power metallurgy techniques utilizing ferro-magnetic metal powder to enable practical formation of this notched part. The notches 72 on rotor 70 are spaced from the notches 63 on stator 60 to provide a gap of predetermined size between these ferro-magnetic members.

Mounted radially within the coil bobbin 54 and resting upon shaft 75 is an annular permanent magnet 66. The magnet 66 is dimensioned such that when in position as shown in FIG. 2, the outer or front face 67 of magnet 66 contacts rotor 70, while the inner or rear face 68 thereof is in contact with the rear wall 62 of stator 60. Magnet 66 is of a suitable permanently magnetizable material such as "Alnico 5".

As has been stated, the sensor assembly 20 is dimensioned and contoured to fit entirely within the axle bore 20. Some exemplary dimensions of the various components of the sensor may serve to better illustrate the compact nature of the sensor. In a typical bore 20 of between about 1.620 in. to 1.630 in. (4.115 cm to 4.140 cm), a typical housing 40 could have a maximum outer diameter of between about 1.600 in. to about 1.610 in. (4.064 cm to 4.090 cm). The axial length of the maximum diameter portion of housing 40 could be about 0.900 Sin. (2.286 cm). The rotor 70 would have an outer diameter of about 1.263 in. (3.208 cm). The rotor thickness would be about 0.156 in. (0.396 cm). A typical bobbin, such as 54 would be about 1.035 in. (2.629 cm) in diameter and having an axial length of about 0.527 in. (1.338 cm). A typical permanent magnet could be about 0.650 in. (2.629 cm) in diameter and about 0.537 in. (1.364 cm) thick. A typical stator such as 60 would have a maximum outside diameter of about 1.484 in. (3.769 cm) and an axial length of about 0.740 in. (1.879 cm).

In operation, the rotatable hub cap 18 will, through connecting arm 17, be operative to rotate shaft 75 upon wheel rotation. The rotor 70 will rotate by virtue of its securement to shaft 16. Magnetic flux from permanent magnet 66 will cause a magnetic field across the gap between stator notches 63 and rotor notches 72. The rotation of rotor notches 72 past stator notches 63 causes a variable magnetic field which induces an alternating current in coil 57 with a frequency proportional to the rotational speed of rotor 70. Thus, by sensing the variation frequency of the current in coil 54, variations in wheel speed can be determined.

The foregoing description presents the invention in accordance with a presently preferred embodiment and obvious modifications can be made to such embodiments without such modifications being considered outside the scope of the invention which is to be measured by the attached claims.

I claim:

1. In combination
  A. an axle adapted to support a wheel for rotation thereon, said axle having a cylindrical bore therein extending axially inwardly from an end of said axle;
  B. a wheel speed sensor assembly disposed in sealed relationship with and entirely within said bore, said sensor assembly comprising:
    1. a hermetically sealed nonmagnetic housing,
    2. a ferromagnetic stator mounted within said housing, said stator having an annular portion provided with a selected number of spaced notches,
    3. a rotor assembly mounted within said housing, said rotor assembly comprising
      a. a rotatable, nonmagnetic shaft and
      b. a ferromagnetic rotor
        i. secured to said shaft,
        ii. having an annular portion provided with number of spaced notches equal to said selected number, and
        iii. disposed relative to said stator so as to provide an annular gap of selected magnitude between the annular notched portion of said stator and the annular notched portion of said rotor;
    4. a permanent magnet mounted within said housing and disposed to generate magnetic flux through said rotor and stator;
    5. a wire coil mounted within said housing and disposed for induction of current by changing magnetic fields caused by rotation of said rotor;
  C. a curved, metallic retainer device disposed
    1. outside said housing
    2. entirely within said bore and
    3. operable, upon flattening, to lock said sensor assembly against both rotational and axial movement relative to said bore; and
  D. means disposed adjacent said retainer device adapted to
    1. be moved into contact with said retainer device and
    2. flatten said retainer device
  E. means disposed outside said housing for connecting said rotor assembly shaft for rotation with a wheel mounted on said axle.

2. The combination recited in claim 1 wherein said notches of said stator extend in substantially an axial direction and are disposed substantially radially outwardly of said notches on said rotor.

3. The combination recited in claim 2 wherein said notches on said rotor extend in substantially an axial direction.

4. The combination recited in claim 1 wherein said retainer device includes a plurality of teeth along at least a portion of the periphery thereof adapted to engage the surface of said bore.

5. The combination recited in claim 2 wherein said retainer device includes a plurality of teeth along at least a portion of the periphery thereof adapted to engage the surface of said bore.

6. The combination recited in claim 3 wherein said retainer device includes a plurality of teeth along at least a portion of the periphery thereof adapted to engage the surface of said bore.

* * * * *